United States Patent
Millard

(10) Patent No.: US 7,373,667 B1
(45) Date of Patent: May 13, 2008

(54) PROTECTING A COMPUTER COUPLED TO A NETWORK FROM MALICIOUS CODE INFECTIONS

(75) Inventor: John Millard, Pasadena, CA (US)

(73) Assignee: Symantec Corporation, Cupertino, CA (US)

( * ) Notice: Subject to any disclaimer, the term of this patent is extended or adjusted under 35 U.S.C. 154(b) by 704 days.

(21) Appl. No.: 10/846,109

(22) Filed: May 14, 2004

(51) Int. Cl.
| G06F 11/00 | (2006.01) |
| G06F 12/14 | (2006.01) |
| G06F 12/16 | (2006.01) |
| G06F 15/18 | (2006.01) |
| G08B 23/00 | (2006.01) |
| H04L 9/00  | (2006.01) |
| H04L 9/32  | (2006.01) |
| G06F 11/30 | (2006.01) |
| G06F 7/00  | (2006.01) |
| G06F 17/30 | (2006.01) |

(52) U.S. Cl. .................. 726/24; 726/26; 713/152; 713/188; 709/227; 709/229; 707/1; 707/10

(58) Field of Classification Search .............. 726/26, 726/24; 709/227; 707/10; 713/152, 188
See application file for complete search history.

(56) References Cited

U.S. PATENT DOCUMENTS

| 5,398,196 A | 3/1995 | Chambers |
| 5,440,723 A | 8/1995 | Arnold et al. |
| 5,452,442 A | 9/1995 | Kephart |
| 5,473,769 A | 12/1995 | Cozza |
| 5,491,791 A | 2/1996 | Glowny et al. |
| 5,495,607 A | 2/1996 | Pisello et al. |
| 5,572,590 A | 11/1996 | Chess |
| 5,675,710 A | 10/1997 | Lewis |
| 5,694,569 A | 12/1997 | Fischer |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,812,763 A | 9/1998 | Teng |

(Continued)

FOREIGN PATENT DOCUMENTS

DE 100 21 686 A1 11/2001

(Continued)

OTHER PUBLICATIONS

Burchell, Jonathan, "NetShield 1.5", Virus Bulletin, Aug. 1994, pp. 21-23, XP 000617453.

(Continued)

*Primary Examiner*—Ayaz Sheikh
*Assistant Examiner*—Shin-Hon Chen
(74) *Attorney, Agent, or Firm*—Fenwick & West LLP

(57) ABSTRACT

Computer implement methods, apparati, and computer-readable media for enabling a first computer (12) to determine that it is safe to communicate with a second computer (10) coupled to the first computer (12) over a network (15). In a method embodiment of the present invention, the first computer (12) detects (21) that the second computer (10) has initiated a test open of a file (14) associated with the first computer (12). When the test open is followed by an actual open command by which the second computer (10) seeks to actually open the same file (14), the first computer (12) determines (23) that it is safe to communicate with the second computer (10).

25 Claims, 4 Drawing Sheets

U.S. PATENT DOCUMENTS

| | | | |
|---|---|---|---|
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,889,943 A | 3/1999 | Ji et al. | |
| 5,944,821 A | 8/1999 | Angelo | |
| 5,949,973 A | 9/1999 | Yarom | |
| 5,951,698 A | 9/1999 | Chen et al. | |
| 5,956,481 A | 9/1999 | Walsh et al. | |
| 5,960,170 A | 9/1999 | Chen et al. | |
| 5,974,549 A | 10/1999 | Golan | |
| 5,978,917 A | 11/1999 | Chi | |
| 5,987,610 A | 11/1999 | Franczek et al. | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |
| 6,070,244 A | 5/2000 | Orchier et al. | |
| 6,072,830 A | 6/2000 | Proctor et al. | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,104,872 A | 8/2000 | Kubota et al. | |
| 6,108,799 A | 8/2000 | Boulay et al. | |
| 6,125,459 A | 9/2000 | Andoh et al. | |
| 6,161,130 A | 12/2000 | Horvitz et al. | |
| 6,167,434 A | 12/2000 | Pang | |
| 6,192,379 B1 | 2/2001 | Bekenn | |
| 6,199,181 B1 | 3/2001 | Rechef et al. | |
| 6,253,169 B1 | 6/2001 | Apte et al. | |
| 6,275,938 B1 | 8/2001 | Bond et al. | |
| 6,298,351 B1 | 10/2001 | Castelli et al. | |
| 6,338,141 B1 | 1/2002 | Wells | |
| 6,347,310 B1 | 2/2002 | Passera | |
| 6,357,008 B1 | 3/2002 | Nachenberg | |
| 6,370,526 B1 | 4/2002 | Agrawal et al. | |
| 6,370,648 B1 | 4/2002 | Diep | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,535,891 B1 | 3/2003 | Fisher et al. | |
| 6,546,416 B1 | 4/2003 | Kirsch | |
| 6,552,814 B2 | 4/2003 | Okimoto et al. | |
| 6,611,925 B1 | 8/2003 | Spear | |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,751,789 B1 | 6/2004 | Berry et al. | |
| 6,763,462 B1 | 7/2004 | Marsh | |
| 6,772,346 B1 | 8/2004 | Chess et al. | |
| 6,813,712 B1 | 11/2004 | Luke | |
| 6,842,861 B1 | 1/2005 | Cox et al. | |
| 6,851,057 B1 | 2/2005 | Nachenberg | |
| 6,873,988 B2 * | 3/2005 | Herrmann et al. ............. 707/10 |
| 6,886,099 B1 | 4/2005 | Smithson et al. | |
| 6,910,134 B1 | 6/2005 | Maher, III et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 7,228,299 B1 | 6/2007 | Harmer et al. | |
| 2002/0004908 A1 | 1/2002 | Galea | |
| 2002/0035693 A1 | 3/2002 | Eyres et al. | |
| 2002/0035696 A1 | 3/2002 | Thacker | |
| 2002/0038308 A1 | 3/2002 | Cappi | |
| 2002/0046207 A1 | 4/2002 | Chino et al. | |
| 2002/0046275 A1 | 4/2002 | Crosbie et al. | |
| 2002/0073046 A1 | 6/2002 | David | |
| 2002/0083175 A1 | 6/2002 | Afek et al. | |
| 2002/0087649 A1 | 7/2002 | Horvitz | |
| 2002/0091940 A1 | 7/2002 | Wellborn et al. | |
| 2002/0103783 A1 * | 8/2002 | Muhlestein ................. 707/1 |
| 2002/0116542 A1 * | 8/2002 | Tarbotton et al. ............ 709/318 |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023865 A1 | 1/2003 | Cowie et al. | |
| 2003/0023875 A1 | 1/2003 | Hursey et al. | |
| 2003/0033587 A1 | 2/2003 | Ferguson et al. | |
| 2003/0051026 A1 | 3/2003 | Carter et al. | |
| 2003/0061287 A1 | 3/2003 | Yu et al. | |
| 2003/0065793 A1 * | 4/2003 | Kouznetsov et al. ......... 709/229 |
| 2003/0065926 A1 | 4/2003 | Schultz et al. | |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0154394 A1 | 8/2003 | Levin | |
| 2003/0167402 A1 | 9/2003 | Stolfo et al. | |
| 2003/0191966 A1 | 10/2003 | Gleichauf | |
| 2003/0212902 A1 | 11/2003 | van der Made | |
| 2003/0233352 A1 | 12/2003 | Baker | |
| 2003/0233551 A1 * | 12/2003 | Kouznetsov et al. ......... 713/175 |
| 2003/0236995 A1 | 12/2003 | Fretwell | |
| 2004/0015554 A1 | 1/2004 | Wilson | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0158730 A1 | 8/2004 | Sarkar | |
| 2004/0162808 A1 | 8/2004 | Margolus et al. | |
| 2004/0177247 A1 * | 9/2004 | Peles ........................... 713/155 |
| 2004/0181687 A1 | 9/2004 | Nachenberg et al. | |
| 2004/0220975 A1 | 11/2004 | Carpentier et al. | |
| 2005/0021740 A1 | 1/2005 | Bar et al. | |
| 2005/0044406 A1 | 2/2005 | Slute | |
| 2005/0132205 A1 | 6/2005 | Palliyil et al. | |
| 2005/0144288 A1 * | 6/2005 | Liao ........................... 709/227 |
| 2005/0177736 A1 | 8/2005 | de los Santos et al. | |
| 2005/0204150 A1 | 9/2005 | Peikari | |
| 2005/0246767 A1 * | 11/2005 | Fazal et al. .................... 726/11 |
| 2005/0262570 A1 * | 11/2005 | Shay ............................ 726/26 |
| 2006/0064755 A1 | 3/2006 | Azadet et al. | |

FOREIGN PATENT DOCUMENTS

| | | |
|---|---|---|
| EP | 0636977 A2 | 2/1995 |

| EP | 1 280 039 A | 1/2003 |
| EP | 1408393 A2 | 4/2004 |
| GB | 2 364 142 A | 1/2002 |
| WO | WO 93/25024 A1 | 12/1993 |
| WO | WO 97/393399 A | 10/1997 |
| WO | WO 99/15966 A1 | 4/1999 |
| WO | WO 00/28420 A2 | 5/2000 |
| WO | WO 01/37095 A1 | 5/2001 |
| WO | WO 01/91403 A | 11/2001 |
| WO | WO 02/05072 A | 1/2002 |
| WO | WO 02/33525 A2 | 4/2002 |

OTHER PUBLICATIONS

Morar, J. E. and Chess, D. M., "Can Crytography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR:http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL:http://outlook.spambully.com/about.php>.

"Enterprise Protection Strategy" [online] Trend Micro Inc. [retrieved Dec. 3, 2002] Retrieved from the Internet: <URL:http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder. Technology Group, Inc., [online] [retrieved Oct. 11, 2002] Retrieved from the Internet <URL: http://www.research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Aho, A.V. et al., Compilers, Addison-Wesley Publishing Company, USA, Revised Edition, 1988, pp. 585-598, 633-648.

Bakos et al., "Early Detection of Internet Worm Activity by Metering ICMP Destination Unreachable Activity," Proc. of SPIE Conference on Sensors, and Command, Control, Communications and Intelligence, Orlando, Apr. 2002.

Delio, M., "Virus Throttle a Hopeful Denfense," Wired News, Dec. 9, 2002, [Retrieved on Jan. 7, 2003], Retrieved from the Internet<URL:http://www.wired.com/news/print/0,1294,56753,00.html>.

"Description of Windows 2000 Windows File Protection Feature (Q222193)," [online], first published May 26, 1999, last modified Jan. 12, 2002, [retrieved on Apr. 9, 2002] Retrieved from the Internet<URL:http://support.microsoft.com/default.aspx?scid=kb:EN-US;q222193>.

Kephart, J. et al., "An Immune System for Cyberspace," IBM Thomas J. Watson Researcher center, IEEE, 1997, pp. 879-884.

"News Release—Symantec Delivers Cutting Edge Anti-Virus Technology with Striker32," Oct. 1, 1999, 2 pages, [online], Retrieved on Nov. 11, 2003, Retrieved from the Internet<URL:http://www.symantec.com/press/1999/n991001.html>, Author Unknown.

Periot, F., "Defeating Polymorphism Through Code Optimization," Paper Given at the Virus Bulletin Conference, Sep. 26-27, Oct. 2003, Toronto, Canada, Published by Virus Bulletin Ltd., The Pentagon, Abingdon, Oxfordshire, England, pp. 142-159.

Randexec web pages [online]. Virtualave.net [First Retrieved May 1, 2003], Retrieved from the Internet <URL:http://pageexec.virtualave.net/docs/randexec.txt>, Copy Retrieved Mar. 21, 2005 from <http://www.pax.grsecuritynet./docs/randexec.txt>.

Randkstack web pages [online]. Virtualave.net [First Retrieved May 1, 2003], Retrieved from the Internet<URL:http://pageexec.virtualave.net/doc/randkstack.txt>, Copy Retrieved Mar. 21, 2005 from <http://www.pax.grescurity.net/docs/randkstack.txt>.

Randmap web pages [online]. Virtualave.net [First Retrieved May 1, 2003], Retrieved from the Internet<URL:http://pageexec.virtualve.net/docs/randmmap.txt>, Copy Retrieved Mar. 21, 2005 from <http://www.pax.grsecurity.net/docs/randmmap.txt>.

Randustack web pages [online]. Virtualave.net [First Retrieved May 1, 2003], Retrieved from the Internet<URL:http://pageexec.virtualave.net/docs/randustack.txt>, Copy Retrieved Mar. 21, 2005 from <http://www.pax.grsecurity.net/docs/randustack.txt>.

"Software: Windows ME; Windows ME and System File Protection," [online] last updated Mar. 11, 2002, [Retrieved on Apr. 9, 2002] Retrieved from the Internet<URL:http://www.wackyb.co.nz/mesfp.html>.

Symantec Corporation, "Norton AntiVirus Corporate Edition," Version 1, 1999, pp. 15, 22.

"System File Protection and Windows ME," [online], last updated Dec. 4, 2001, [Retrieved on Apr. 9, 2002] Retrieved from the Internet<URL:http:www.Microsoft.com/hwdev/archive/sfp/winME_sfpP.asp>.

Szor, P. et al., "Attacks on Wind32," Virus Bulletin Conference, Virus Bulletin Ltd., The Pentagon, Abingdon, Oxfordshire, England, Sep. 1998, p. 57-84.

Szor, P. et al., "Attacks on Win32 Part II," Virus Bulletin Conference, Virus Bulletin Ltd., The Pentagon, Abingdon, Oxfordshire, England, Sep. 2000, pp. 47-68.

Szor, P. et al., "Hunting for Metamorphic," Virus Bulletin Conference, Virus Bulletin Ltd., The Pentagon, Abingdon, Oxfordshire, England, Sep. 2001, pp. 123-144.

Szor, P., "Memory Scanning Under Windows NT," Virus Bulletin Conference, Virus Bulletin Ltd., The Pentagon, Abingdon, Oxfordshire, England, Sep. 1999, pp. 1-22.

Toth et al., "Connection-History Based Anomaly Detection," Proceedings of the 2002 IEEE Workshop on Information Assurance and Security, West Point, NY, Jun. 17-19, 2002, pp. 30-35.

VMA Mirroring Web Pages [online], Virtualave.net [Retrieved May 1, 2003], Retrieved from the Internet<URL:http://pageexec.virtualave.net/docs/vmmirror.txt>, Copy Retrieved Mar. 21, 2005 from <http://www.pax.grsecurity.net/docs/vmmirror.txt>.

Von Babo, M., "Zehn Mythen um Computerviren: Dichtung und Wahrheit über den Schrecken des Informatikzeitalters," Technische Rundschau, Hallwag, Bern, Switzerland, Sep. 4, 1992, pp. 44-47, vol. 84, No. 36.

Parkhouse, Jayne, Pelican SafeTNet 2.0, SCMagazine Product Review, (SC Magazine, Framingham, Massachusetts, USA) http://www.scmagazine.com/scmagazine/standalone/pelican/sc_pelican.html, no date.

* cited by examiner

PROTECTING A COMPUTER COUPLED TO A NETWORK FROM MALICIOUS CODE INFECTIONS

RELATED APPLICATION

This patent application claims priority upon commonly owned U.S. patent application Ser. No. 10/846,100 filed May 14, 2004, entitled "Opening Computer Files Quickly and Safely Over a Network", which patent application is hereby incorporated by reference in its entirety into the present patent application.

TECHNICAL FIELD

This invention pertains to the field of protecting a computer coupled to a network from malicious code infections.

BACKGROUND ART

As used herein, "malicious computer code" is any code that enters a computer without the knowledge and/or consent of an authorized user of the computer and/or a system administrator of an enterprise incorporating the computer. Thus, "malicious computer code" encompasses, but is not limited to, viruses, worms, Trojan horses, spam, adware, and unwanted popups. The most common types of malicious code thwarted by the present invention are viruses, worms, and Trojan horses.

With reference to FIG. 1, when a computer 12 is running in a network environment, said computer 12 may be accessed by other computers 10 that are also coupled to the network 15. FIG. 1 illustrates a plurality n of such network computers 10. Computers 10,12 may be part of an enterprise 1, such as a corporation or university. n can be any positive integer.

When computer 12 is a server, it is particularly susceptible to being accessed by other computers 10, because the raison d'être of a server is to be so accessed. When computer 12 is a client computer, it may also be accessed by network computers 10 via file shares established between computer 12 and one or more network computers 10. These file shares may have been established for legitimate business, academic, or governmental purposes. Interposing a firewall between computer 12 and the network 15 would not protect computer 12 from malicious code entering through one of these file shares, because the firewall would be programmed to intentionally allow communication between computer 12 and those computers 10 with which computer 12 is authorized to share files. It is desired to prevent a computer 10 that is infected with malicious code from modifying any files on computer 12. Such a modification might damage the infected file, so that it may not be completely repairable, or not repairable at all; or the file could be completely deleted. It is also desired to minimize the coupling between computer 12 and a computer 10 that is unprotected. By "unprotected" is meant that such a computer 10 either does not have a malicious code scanning means, or else it has a malicious code scanning means but said means is ineffective, e.g., it contains outdated malicious code definitions.

Any one or more of computers 10,12 could be a laptop computer or a PDA (Personal Digital Assistant) that an employee of, or a vendor to, enterprise 1 has coupled to network 15. Such computers 10,12 are capable of infecting other enterprise computers 10,12 with malicious code, and are also susceptible to themselves being infected with malicious code (e.g., by a third party), thus presenting dangers when they are coupled to network 15.

The present invention protects computers 10,12 in a network environment, without imposing a high administrative burden in tracking down and protecting unprotected computers 10,12.

DISCLOSURE OF INVENTION

Computer implement methods, apparati, and computer-readable media for enabling a first computer (12) to determine that it is safe to communicate with a second computer (10) coupled to the first computer (12) over a network (15). In a method embodiment of the present invention, the first computer (12) detects (21) that the second computer (10) has initiated a test open of a file (14) associated with the first computer (12). When the test open is followed by an actual open command by which the second computer (10) seeks to actually open the same file (14), the first computer (12) determines (23) that it is safe to communicate with the second computer (10).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
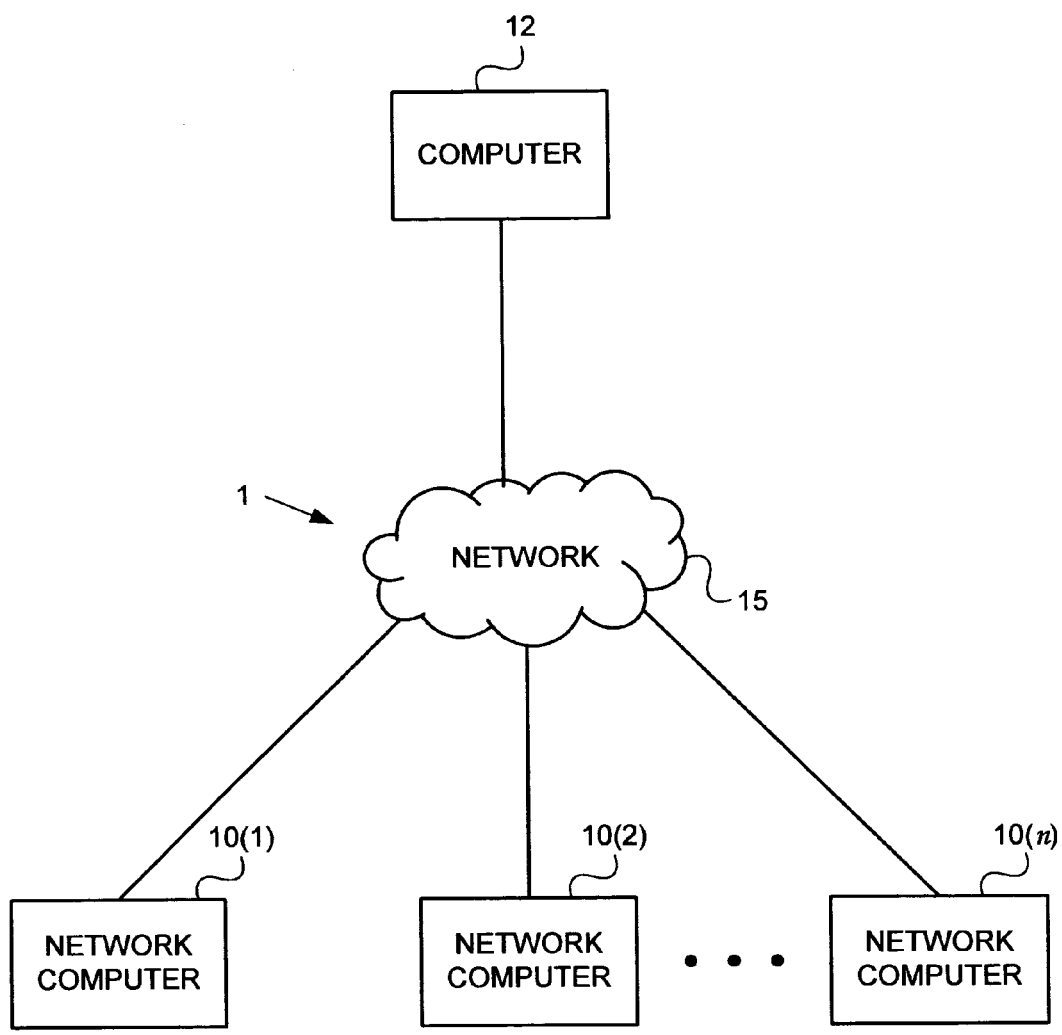
FIG. 1 is a system level diagram illustrating a typical configuration of the prior art.
Figure 3:
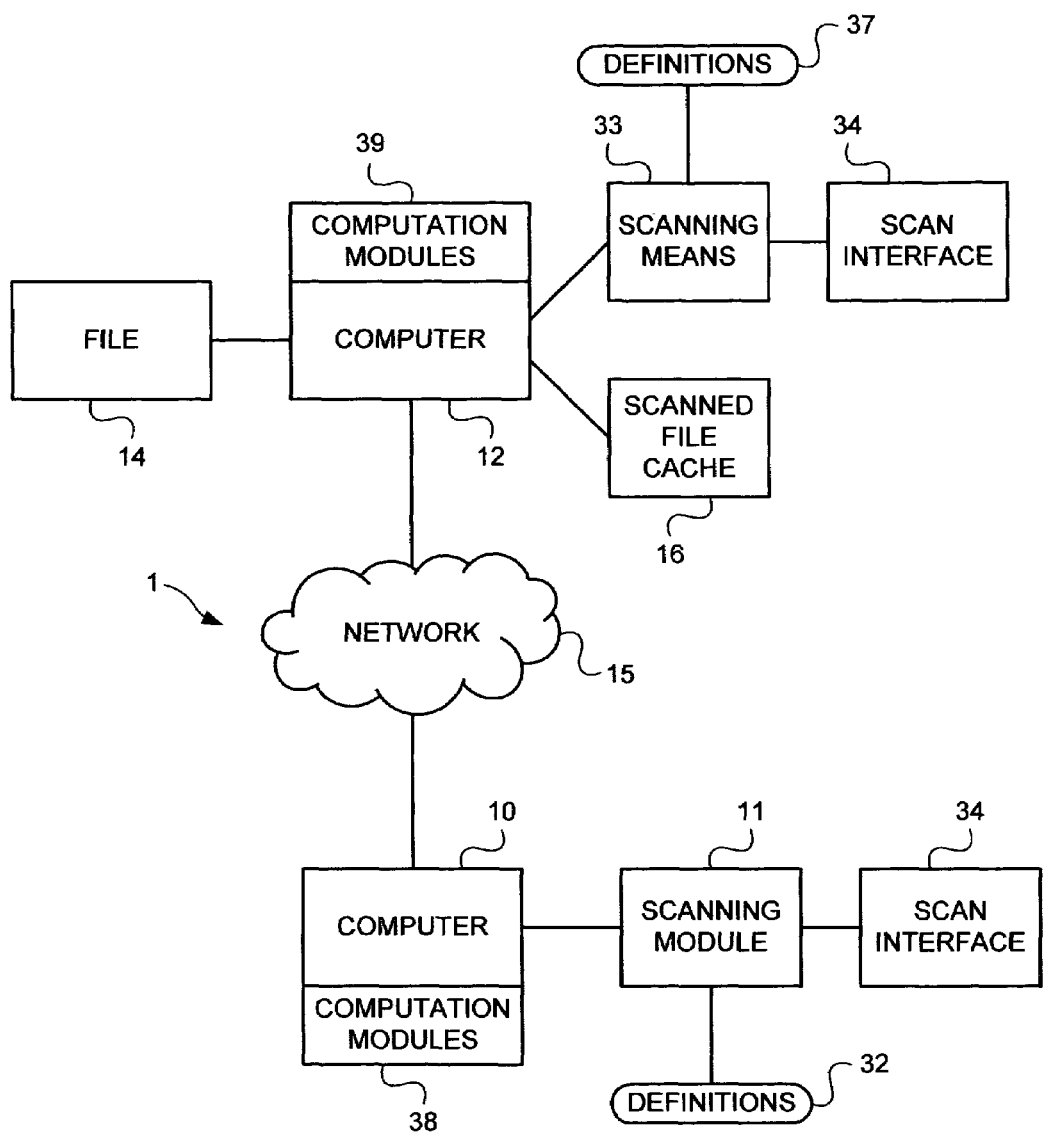
FIG. 3 is a system level diagram illustrating items usable in the present invention.

With reference to FIG. 3, computer 10 and computer 12 are coupled to each other over a network 15. Computer 10 can be one of a plurality of network computers 10 as illustrated in FIG. 1. As used herein, "coupled" means any direct or indirect coupling by which computers 10 and 12 may communicate with each other. Network 15 can be any wired or wireless network, or any combination of wired and wireless networks. Thus, network 15 can comprise the Internet, a local area network (LAN), a wide area network (WAN), a WiFi network, a Bluetooth network, etc. Computers 10,12 can be any combination of server computers and client computers. Associated with computer 10 is malicious code scanning module 11. This may be a real-time module that is capable of detecting malicious code within a computer file such as file 14 associated with computer 12. A suitable example of module 11 is AutoProtect manufactured by Symantec Corporation of Cupertino, Calif.

Similarly, computer 12 may have associated therewith a malicious code scanning means 33. As with scanning module 11, scanning means 33 may be a real-time module capable of detecting malicious code in a computer file such as file 14. Results of the scanning of file 14 by scanning means 33 may be placed into a scanned file cache 16, which can be any type of memory device associated with computer 12.

The broad method steps of the present invention may be performed by suitably modifying scanning means 33. These modifications can be performed by one of ordinary skill in the software art. Alternatively, said method steps may be performed by one or more computational modules 39 associated with computer 12, or by a combination of said computational modules 39 working in conjunction with scanning means 33. Similarly, computer 10 can be fitted with special computational modules 38 suitable for use in the present invention, and/or scanning module 11 can be appropriately modified for use in the present invention. As a shorthand notation, whenever it is stated herein that computer 10 performs a certain action, it is meant that the action is performed by module 11 and/or modules 38. Similarly, whenever it is stated herein that computer 12 performs a certain action, it is meant that said action is performed by scanning means 33 and/or modules 39. All of the modules and means mentioned in this paragraph can be implemented in software, firmware, hardware, or any combination thereof.

Figure 4:
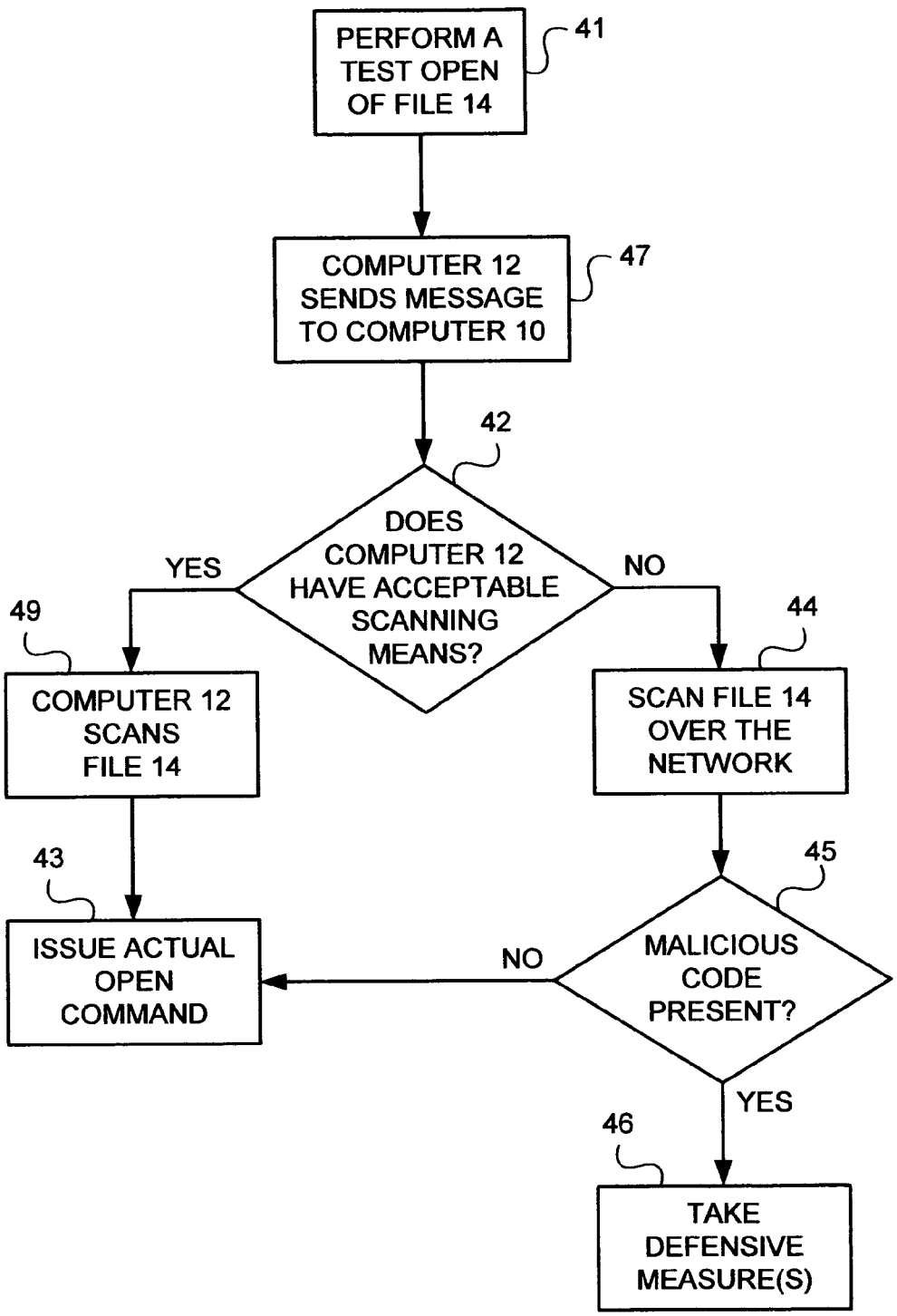
FIG. 4 is a flow diagram illustrating a method by which computer 10 can safely and quickly open file 14 over network 15 by determining that computer 12 has acceptable malicious code scanning means 33.

A method embodiment of the present invention will now be described in conjunction with FIG. 2. The method starts at optional authentication step 20, which will be described below. At step 21, computer 12 detects that computer 10 seeks to initiate a test open of file 14, i.e. the test open illustrated as step 41 in FIG. 4.

One technique by which computer 12 can detect such a test open in step 21 is to observe that computer 10 is requesting to open a dummy file having a pathname consisting of the pathname of file 14, plus a tag appended to said file 14 pathname. The tag may comprise a globally unique identifier (GUID) of computer 10 (useful to identify computer 10 when computer 10 is but one of n computers in an enterprise 1) and the date that malicious code definitions 32 associated with malicious code scanning module 11 were last updated. The GUID can be based on the MAC (Message Authentication Code) associated with computer 10. In this embodiment, the presence of the tag creates a pathname for a dummy file that is not likely to exist within the purview of computer 12. Thus, computer 12 should not be able to open such a file. If remote computer 12 is able to open such a file, it indicates that something is wrong: perhaps a malicious individual is spoofing the system, or the presence of the tag has accidentally resulted in a valid pathname for a file other than file 14. Thus, if computer 12 opens a file during the test open, in one embodiment computer 10 retries the test open by changing the GUID portion of the tag so that the augmented pathname does not correspond to an actual file 14.

An example of a pathname of file 14 is:

C:\roberta\jake\

In this example, the pathname augmented with a tag having a GUID of computer 10 and the most recent definitions 32 update date might be:

C:\roberta\jake8163412aug2003

The contents of the tag are tailored to preselected acceptability criteria by which computer 10 determines, in response to feedback received from computer 12, whether computer 12 has an acceptable malicious code scanning means 33 (step 42). "Acceptability" can be defined in a number of ways, and is pre-determined prior to operation of the present invention. For example, an "acceptable" malicious code scanning means 33 can be defined to be one which satisfies one or more of the following criteria: the scanning means 33 is present, active (switched on), capable of scanning file 14, contains malicious code definitions 37 that are at least as current as definitions 32 associated with malicious code scanning module 11, has an acceptable definition window, scans all appropriate file extensions, has a heuristic level set to at least a certain amount, has any other settings that the means 33 is capable of. An "acceptable definition window" can be a time window such as "malicious code definitions are not more than a week old".

If computer 10 determines that computer 12 has acceptable malicious code scanning means 33, computer 12 scans file 14 (step 49), then computer 10 issues a command to actually open file 14 (step 43), relying on said scan by computer 12. The rationale for this reliance is that if computer 12 has an acceptable malicious code scanning means 33, there is no need for computer 10 to perform a slow, cumbersome malicious code scan on file 14 over network 15.

If, on the other hand, computer 12 does not have an acceptable malicious code scanning means 33 from the point of view of computer 10, computer 10 scans file 14 over the network 15 (step 44), since computer 10 cannot rely on any scanning of file 14 by computer 12. Then computer 10 inquires (step 45) as to whether the result of the scan indicates that malicious code may be present within file 14. If not, computer 10 initiates a command to actually open file 14 as before (step 43).

If, on the other hand, the above inquiry indicates that malicious code may be present within file 14, computer 10 performs (step 46) at least one defensive measure from the group of measures comprising: a false positive mitigation technique; a verification that malicious code is in fact present within file 14; an alert to a system administrator for enterprise 1; aborting the opening of file 14; quarantining file 14; sending file 14 to an antivirus research center such as Symantec Antivirus Research Center (SARC); setting a flag to preclude subsequent downloads of files from computer 12; initiating an investigation as to why computer 12 may have become infected with malicious code; any other measure that one of prudence and good judgment might take when informed that malicious code might be present.

As stated previously, the contents of the tag are tailored to the preselected acceptability criteria. For example, if one of the acceptability criteria is that scanning means 33 must have its heuristic level set to at least a certain amount, then this required heuristic level is part of the tag. It also may be desirable to affix the name of computer 10 and/or the IP (Internet Protocol) address of computer 10 as part of the tag. This enables tracing the origins of malicious code if the attempted open causes malicious code to enter computer 12. Components of the tag are stored in a memory device associated with computer 12 prior to execution of step 22.

In response to the test open, computer 12 sends to computer 10 (step 47) a message conveying information pertaining to malicious code scanning capabilities of computer 12. In one embodiment, the message is sent over the same file open channel that is used for the opening of file 14 over network 15. Using the same file open channel makes the query of computer 12 quick and simple, and piggybacks on the security of the file open channel itself. This simplicity is evident at both computer 12 and computer 10. Computer 12 checks the end of the pathname for the tag, compares definition dates and file exclusions (if these are part of the acceptability criteria), and returns the message to computer 10. Computer 10 manufactures a file open that is a simple modification of an existing open, and checks the message received from computer 12.

In an alternative embodiment, the message from computer 12 to the local computer 12 is sent via a channel other than the file open channel. This can be done by opening a port and sending packets back and forth between the two computers 10,12 using TCP (Transport Control Protocol), UDP (Universal Datagram Protocol), ICMP (Internet Control Management Protocol), etc. Other possibilities are to use DCOM (Distributed Communications Object Method), WMI, SNMP (Simple Network Management Protocol), RPC (Remote Procedure Calls), SSL (Secure Socket Layers), TLS (Transport Layer Security), etc.

The message returned from computer 12 to computer 10 contains information pertinent to the pre-established acceptability criteria. In one embodiment, said message contains information as to whether computer 12 has malicious code scanning means 33, and whether definitions 37 associated with said scanning means 33 are at least as new as the definitions 32 associated with the malicious code scanning module 11 of computer 10. Computer 10 then decodes the message (step 42). When the message reveals that computer 12 has malicious code scanning means 33, and the malicious code scanning means 33 has definitions 37 at least as new as the definitions 32 in the malicious code scanning module 11 associated with computer 10, computer 12 scans file 14 (step 49), then computer 10 issues a command to actually open file 14 (step 43), relying on said scan by computer 12. When these acceptability conditions are not satisfied, however, computer 10 does not rely on computer 12 to perform the scan, and instead computer 10 performs a malicious code scan of file 14 over the network 15 (step 44), slow and cumbersome as that might be.

The message returned from computer 12 to computer 10 can be a set of one or more error messages. For example, in a WIN32 operating system, the conventional 32 bit error code can be used. For example:

The error message "file not found" can mean that there is no scanning means 33 associated with computer 12;

The error message "access denied" can mean that there is scanning means 33 associated with computer 12; and The error message "error 18" can mean that there is scanning means 33 associated with computer 12 and it meets all the pre-established acceptability criteria.

In one embodiment, when computer 12 detects the test open that has been initiated by computer 10, computer 12 asynchronously begins to scan file 14 using scanning means 33. The rationale for this is that the presence of a test open indicates that there is a high probability that computer 12 will be called upon shortly to perform said scan, so it may as well start as soon as possible to save time. Such a scan may very well be completed before the "actual open" command is issued by computer 10. The results of the scan by computer 12 are typically placed into scanned file cache 16, which is typically set up as a LRU (Least Recently Used) cache, i.e., the most recent results are placed at the top of the cache.

Figure 2:
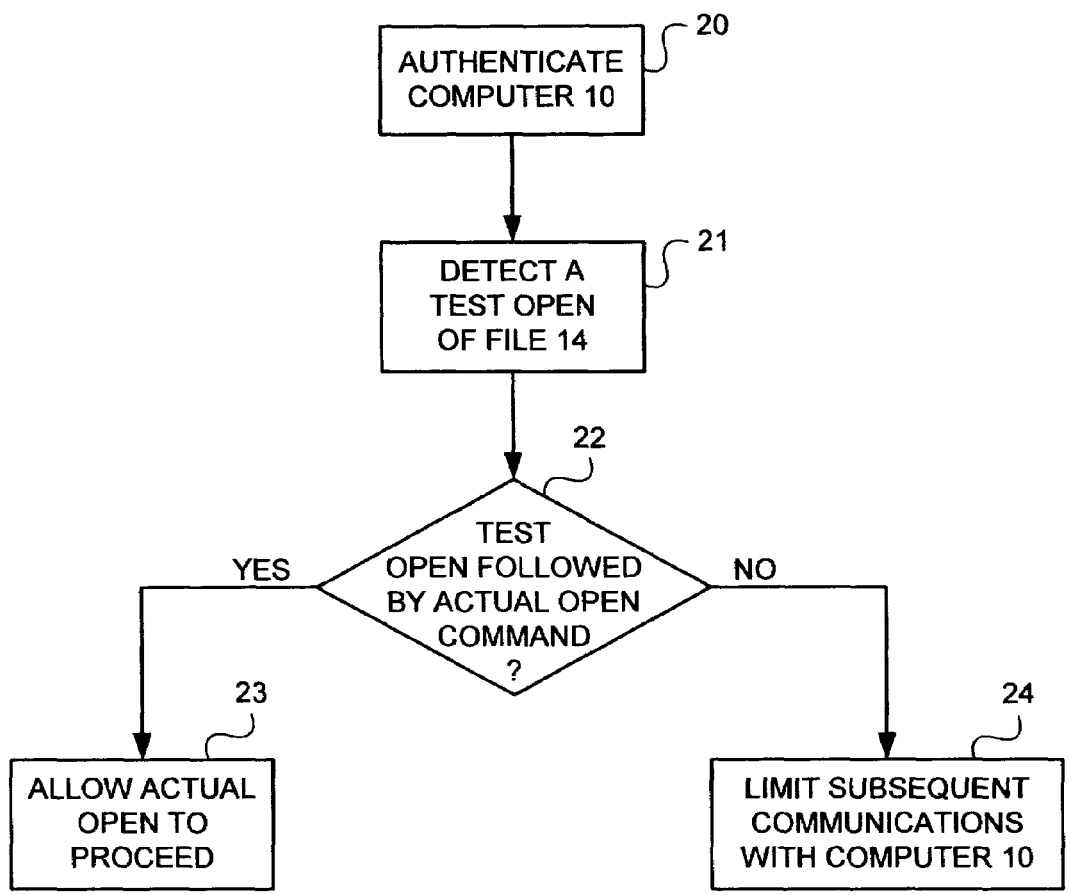
FIG. 2 is a flow diagram illustrating a method embodiment of the present invention.

Let us now return to a discussion of FIG. 2. At step 22, computer 12, using the information from the tag that it had stored previously in step 21, determines whether the test open is followed (say, within a preselected period of time) by a command emanating from the same computer 10 to actually open the same file 14 that was the subject of the test open detected in step 21. When this condition is satisfied, the method proceeds to step 23, where computer 12 allows the actual open of file 14 to proceed. In other words, computer 12 determines that it is safe to communicate with computer 10, because computer 12 has determined that computer 10 is equipped with the clever means described above for determining that computer 12 has an acceptable malicious code scanning means 33.

If, on the other hand, the condition tested in step 22 is not satisfied, the method proceeds to step 24, where computer 12 determines that it is not altogether safe to communicate with computer 10, and thus computer 12 limits subsequent communications with computer 10. Such a limitation may comprise refusing to communicate at all with computer 10, refusing to share files such as file 14 with computer 10, allowing computer 10 to read from file 14 but not to write to file 14, or any other limitation that computer 12 wishes to impose. The limitation may be a function of the type of file 14. For example, if file 14 comprises executable code, computer 12 may impose more severe limitations than if file 14 does not contain executable code.

In order to provide additional protection to computer 12 before computer 12 communicates with computer 10, optional authentication step 20 can be performed.

One way of performing step 20 is to use public key cryptography, in which the two computers 10,12 exchange digitally signed mutual authentication packets. This requires that the private keys of the computers 10,12 be hidden from malicious persons. Otherwise, malicious code could be written to spoof the authentication.

Another way to provide the authentication of step 20 is for the two computers 10,12 to trade a malicious code fragment for a unique malicious code identifier. The malicious code identifier is a unique number associated with that malicious code. Just a fragment, rather than the entire malicious code, is sent, because sending the entire malicious code would take too much time. The trade can be in either direction. In one direction, computer 10 sends the malicious code fragment to computer 12, and computer 12 sends the malicious code identifier to computer 10. In the other direction, computer 10 sends the malicious code identifier to computer 12, and computer 12 sends the malicious code fragment to computer 10. The rationale for this technique is that one computer requests from the other computer knowledge that only the other computer has, in this case the knowledge of identifying malicious code. So, for example, the authentication message can contain an obfuscated fragment of malicious code extracted from the definitions (32 or 37) associated with the challenging computer (10 or 12). This code may look very little like real malicious code, and cannot execute because is just a fragment.

An acceptable response to the authentication message must include the unique malicious code identifier. This can be done in two ways. In one way, the malicious code fragment is augmented by a standard husk and subjected to a malicious code scan (by scanning means 33 or scanning module 11). As used herein, "husk" is code that wraps around and encapsulates another piece of code or data. A husk is sometimes referred to as a "wrapper" or "container" or "security envelope". In the other way, scanning means 33 or scanning module 11 is pre-fitted with a scan interface 34 that converts malicious code fragments into unique malicious code identifiers, e.g., by using a lookup table. In either way, it is desirable that the challenge message sent between each pair of computers 10,12 is different each time such a message is sent, and does not follow a predictable pattern or start at a predictable location in the list of definitions (32 or 37). A computer 10,12 that sends the same challenge pattern or response each time should be flagged as suspicious by the other computer 12,10. This minimizes the possibility of replay attacks, i.e., attacks premised upon sending a known response to a known challenge based upon having intercepted a communication showing the challenge/response. To further minimize replay attacks, challenges should be composed from relatively new definitions in the set of definitions (32 or 37).

It is not necessary to perform this authentication procedure every time a file 14 is opened. A user of computer 10,12 can turn the authentication on or off at will, the authentication can be performed every so many file 14 opens, etc. The important thing is for the link between computers 10,12 to be authenticated prior to the first time these two computers 10,12 share a file 14.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method by which a first computer determines that it is safe to communicate with a second computer coupled to the first computer over a network, said method comprising the steps of the first computer:
   detecting that the second computer has initiated a test open of a first file stored in association with the first computer;
   sending to the second computer a message conveying information pertaining to malicious code scanning capabilities of the first computer;
   detecting an actual open command for the first file from the second computer responsive to second computer determining that the first computer has acceptable malicious code scanning capabilities;
   detecting a malicious code scan of the first file conducted over the network by the second computer responsive to the second computer determining that first computer does not contain malicious code scanning capabilities;
   detecting an actual open command for the first file from the second computer when the malicious code scan of the first file over the network indicates that the first file does not contain malicious code; and
   when the test open is followed by an actual open command from the second computer seeking to actually open the first file, determining that it is safe to communicate with the second computer.

2. The method of claim 1 wherein determining it is safe to communicate comprises allowing the actual open to proceed.

3. The method of claim 1 wherein the step of detecting a test open comprises observing that the second computer is requesting to open a dummy file having a pathname consisting of the pathname of said first file, plus a tag appended to said first file pathname.

4. The method of claim 3 wherein the tag comprises a globally unique identifier for the second computer and a date of last updating malicious code definitions within a malicious code scanning module associated with the second computer.

5. The method of claim 3 wherein the tag comprises at least one of:
   an acceptable heuristic level for malicious code scans;
   an acceptable definition window for malicious code scans;
   name of the second computer; and
   IP address of the second computer.

6. The method of claim 1 wherein, when the test open is not followed by an actual open command from the second computer seeking to actually open the first file, the first computer limits subsequent communications with the second computer.

7. The method of claim 1 wherein the message is sent from the first computer to the second computer over a file open channel.

8. The method of claim 1 wherein the message is sent from the first computer to the second computer over a channel other than a file open channel.

9. The method of claim 8 wherein the channel used for the message uses at least one of TCP, UDP, ICMP, DCOM, WMI, SNMP, and RPC.

10. The method of claim 1 wherein the message contains information as to whether the first computer has malicious code scanning means and whether definitions associated with said scanning means are at least as new as definitions associated with a malicious code scanning module associated with the second computer.

11. The method of claim 1 further comprising the step of the second computer decoding the message.

12. The method of claim 1 wherein the second computer issues an actual open command to actually open the first file when the message reveals that the first computer has malicious code scanning capabilities deemed to be acceptable according to pre-established acceptability criteria.

13. The method of claim 1 wherein the second computer conducts a malicious code scan of the first file over the network when the message reveals that the first computer does not contain malicious code scanning capabilities deemed to be acceptable according to pre-established acceptability criteria.

14. The method of claim 13 wherein, when the malicious code scan of the first file done over the network indicates that the first file may contain malicious code, the second computer performs at least one defensive measure from the group of measures comprising:
   a false positive mitigation technique;
   verification that malicious code is in fact present within the first file;
   an alert to a system administrator;
   aborting the opening of the first file;
   quarantining the first file;
   sending the first file to an antivirus research center;
   precluding subsequent downloads from the first computer;
   initiating an investigation as to why the first computer may have become infected with malicious code.

15. The method of claim 1 wherein the first computer asynchronously starts a scan of the first file when the first computer detects the test open.

16. The method of claim 1 wherein the first computer authenticates the second computer prior to detecting that the second computer has initiated has initiated a test open.

17. The method of claim 16 wherein the authentication is performed using public key cryptography.

18. The method of claim 16 wherein the authentication is performed by the first and second computers trading a malicious code fragment for a malicious code identifier.

19. The method of claim 18 wherein the first computer sends the malicious code fragment to the second computer, and the second computer sends the malicious code identifier to the first computer.

20. The method of claim 18 wherein the first computer sends the malicious code identifier to the second computer, and the second computer sends the malicious code fragment to the first computer.

21. The method of claim 18 wherein the malicious code fragment is augmented by a husk and subjected to a malicious code scan.

22. The method of claim 18 wherein the malicious code fragment is matched to the malicious code identifier via a malicious code scan interface.

23. The method of claim 1, further comprising the step of the first computer scanning the first file for the presence of malicious code when the test open discloses that the first computer has an acceptable malicious code scanning means.

24. Apparatus associated with a first computer desiring to communicate safely with a second computer coupled to the first computer over a network, said apparatus comprising:
   test open detecting means for detecting that the second computer has initiated a test open of a file stored in association with the first computer;
   coupled to the test open detecting means, sending means for sending to the second computer a message conveying information pertaining to malicious code scanning capabilities of the first computer;
   coupled to the sending means, observing means for observing an actual open command for the first file from the second computer to actually open the same file responsive to second computer determining that the first computer has acceptable malicious code scanning capabilities;
   coupled to the sending means, code scan detecting means for detecting a malicious code scan of the first file conducted over the network by the second computer responsive to the second computer determining that first computer does not contain malicious code scanning capabilities;
   coupled to the code scan detecting means second observing means for observing an actual open command for the first file from the second computer to actually open the same file when the malicious code scan of the first file over the network indicates that the first file does not contain malicious code; and
   coupled to the second observing means, safety means for determining that it is safe to communicate with the second computer.

25. A computer-readable medium containing computer program instructions for enabling a first computer to determine that it is safe to communicate with a second computer coupled to the first computer over a network, said computer program instructions performing the steps of:
   detecting that the second computer has initiated a test open of a first file stored in association with the first computer;
   sending to the second computer a message conveying information pertaining to malicious code scanning capabilities of the first computer;
   detecting an actual open command for the first file from the second computer responsive to second computer determining that the first computer has acceptable malicious code scanning capabilities;
   detecting a malicious code scan of the first file conducted over the network by the second computer responsive to the second computer determining that first computer does not contain malicious code scanning capabilities;
   detecting an actual open command for the first file from the second computer when the malicious code scan of the first file over the network indicates that the first file does not contain malicious code; and
   when the test open is followed by an actual open command from the second computer seeking to actually open the first file, determining that it is safe to communicate with the second computer.

* * * * *